United States Patent [19]

Cheadle et al.

[11] Patent Number: 4,782,891
[45] Date of Patent: Nov. 8, 1988

[54] CORROSION INHIBITING COOLANT FILTER

[75] Inventors: Brian E. Cheadle, Bramalea; Richard J. Rusiniak, Oakville, both of Canada

[73] Assignee: Long Manufacturing Ltd., Oakville, Canada

[21] Appl. No.: 50,777

[22] Filed: May 18, 1987

[30] Foreign Application Priority Data

Dec. 23, 1986 [CA] Canada ............................... 526256

[51] Int. Cl.[4] ............................................. F28F 19/00
[52] U.S. Cl. .............................. 165/134.1; 123/41.15;
210/205; 210/416.5
[58] Field of Search .................. 165/134.1; 123/41.15;
210/198.1, 199, 205, 416.5

[56] References Cited

U.S. PATENT DOCUMENTS

| | | | |
|---|---|---|---|
| 3,321,083 | 5/1967 | Thornton | 210/198.1 |
| 4,075,098 | 2/1978 | Paul et al. | 210/199 X |
| 4,333,516 | 6/1982 | Krueger et al. | 165/134.1 X |
| 4,338,997 | 7/1982 | Krueger et al. | 165/134.1 |
| 4,379,052 | 4/1983 | Stearns | 123/41.15 X |

*Primary Examiner*—Charles J. Myhre
*Assistant Examiner*—Peggy Neils
*Attorney, Agent, or Firm*—Krass & Young

[57] ABSTRACT

A filter device for an engine coolant includes a housing with an inlet for inflow of coolant and an outlet for outflow; a flow path extends between the inlet and outlet, a filter in the flow path filters the coolant; a dosage of corrosion inhibitor is disposed in the housing, corrosion inibitor being separated from the flow path by a separating means exposed to coolant in the flow path; the separating means disintegrates by corrosion when coolant in the flow path has a corrosiveness above a predetermined level thereby releasing the dosage of corrosion inhibitor into the coolant.

18 Claims, 4 Drawing Sheets

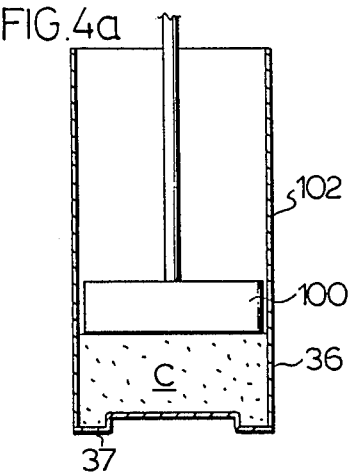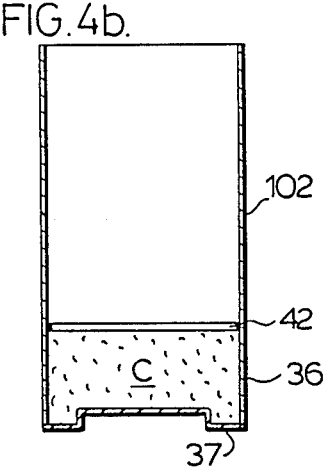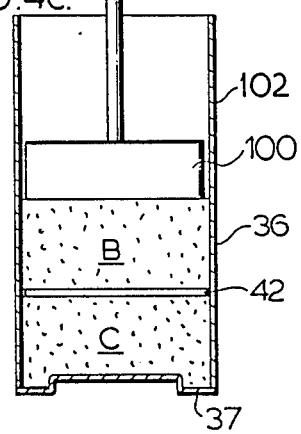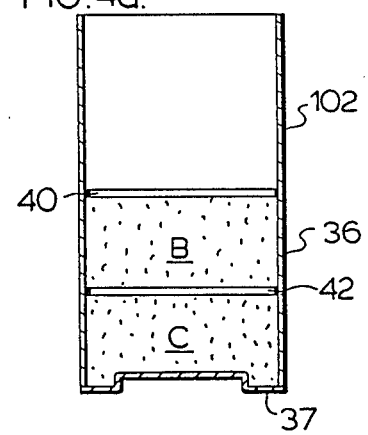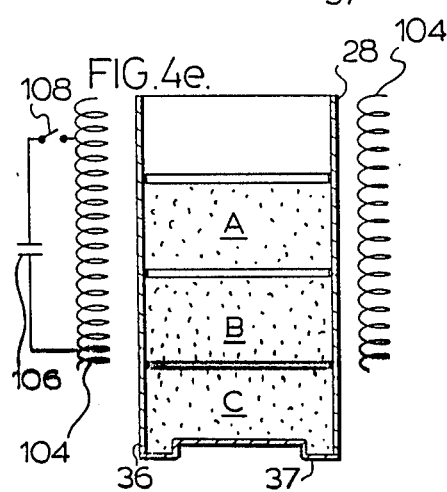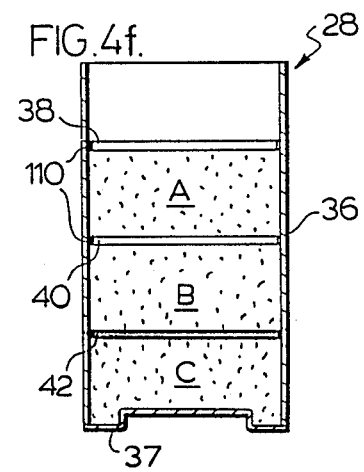

CORROSION INHIBITING COOLANT FILTER

BACKGROUND OF THE INVENTION

This invention is concerned with the treatment of engine coolants in the cooling systems of automotive vehicles; more especially the invention is concerned with a filter device for the coolant which provides controlled release of corrosion inhibitor into the coolant.

Engine coolants in an automotive vehicle are continuously circulated during operation of the vehicle to remove heat developed by the engine. Corrosion inhibitors are added to the coolant to prevent corrosion of parts of the cooling system. It is preferable to filter the flowing coolant to remove foreign matter and debris entrained therein which may damage, block or otherwise interfere with the cooling system.

A typical engine coolant is based on an antifreeze mixture of ethylene glycol, diethylene glycol and water. Corrosion of the metal parts contacted by the coolant occurs if the mixture is not maintained with approximately a 50% content of correctly inhibited ethylene glycol. Thus corrosion inhibitors are added to coolants, typically a mixture of one or more salts, for example, phosphates, borates, nitrates, nitrites, silicates, arsenates, molybdates or benzoates; and one or more organic compounds, for example, benzotriazole, tolyltriazole or mercaptobenzothiazole, to prevent corrosion of metal parts contacted by the coolant.

It is necessary to add additional corrosion inhibitor to the coolant periodically in order to maintain a desired level of corrosion protection: Corrodible containers for automatically dispersing corrosion inhibitor to the coolant have been proposed, for example in U.S. Pat. Nos. 4,333,516, 4,338,997 and 4,347,895.

Filters are employed in cooling systems to filter the flowing coolant, thereby removing foreign matter and debris. Foreign matter in the form of particles suspended or entrained in the coolant may absorb corrosion inhibitor thereby reducing the available content of corrosion inhibitor in the coolant, may produce erosion damage, and may affect seal integrity. Thus filters also function to prevent reduction of corrosion inhibitor content.

Pellets of corrosion inhibitors have been incorporated in filter devices, however, these have a short life and the filter devices are usually replaced at recommended intervals of 12,000 to 20,000 miles when the corrosion inhibitor pellet supply originally in the device is depleted, even though the filter medium itself has an effective life of 60,000 miles or more.

SUMMARY OF THE INVENTION

The present invention provides a filter device which permits controlled release of corrosion inhibitor into a coolant when the coolant has a corrosiveness above a predetermined level.

In particular the filter device has a plurality of dosages of corrosion inhibitor which are released successively with a delay so that a required level of corrosion inhibitor can be maintained in the coolant to extend the life of the filter for as much as up to 80,000 miles.

In accordance with the invention, a filter device for an engine coolant comprises a housing having inlet means for inflow of a liquid coolant into the housing and outlet means for outflow of coolant from the housing. A flow path is provided in the housing for flow of coolant from the inlet means to the outlet means, and a filter means is disposed in the flow path effective to filter the coolant. A container of corrosion inhibitor for the coolant is disposed in the housing, and has a portion having a surface exposed to the flow path, the portion separating the flow path from the corrosion inhibitor. At least a part of the portion is adapted to disintegrate by corroding when coolant in the flow path has a corrosiveness above a predetermined level, to release corrosion inhibitor from the container into the flow path.

It will be understood that, in the present invention, a coolant having a corrosiveness above a predetermined level is one having a content of corrosion inhibitor below a predetermined level.

In particular, the portion of the housing at least part of which is adapted to disintegrate, is in the form of a partition or membrane having an outer surface exposed to the flow path and an inner surface exposed to the corrosion inhibitor.

The invention also contemplates a cooling system incorporating the filter device. In particular, the system may include a heat exchanger, a line for flow of heated coolant into the heat exchanger from an engine cooling jacket, and a line for flow of a cooled coolant back to the cooling jacket from the heat exchanger; the filter device may conveniently be incorporated as a by-pass in the line for flow of heated coolant.

The invention also contemplates a filter element comprising the filter means and the container of corrosion inhibitor as a component of the filter device.

In another aspect of the invention, there is provided a method of treating a flowing engine coolant. The coolant is flowed along a flow path between an inlet and an outlet of a housing and is filtered in the flow path. The flowing coolant in the flow path is contacted with a separating means which separates the flowing coolant from a dosage of corrosion inhibitor for the coolant. At least part of the separating means disintegrates by corroding when the coolant has a corrosiveness above a predetermined level and releases the dosage of corrosion inhibitor into the coolant.

It will be understood that the corrosiveness of the coolant increases with the passage of time in service. The separating means does not corrode in properly inhibited coolant, however, as the coolant becomes more corrosive, the separating means begins to corrode and will corrode at a rate faster or equivalent to that of other portions of the cooling system exposed to the coolant. Disintegration of the separating means by corrosion occurs above the predetermined level of corrosion to effect release of corrosion inhibitor whereby significant corrosion of other parts of the cooling system is prevented.

Disintegration occurs rapidly as a result of the corrosiveness rising above the predetermined level. In particular, the separating means is selected so that it will disintegrate by corrosion to release corrosion inhibitor before the corrosiveness of the coolant can damage other parts of the cooling system.

In another aspect of the invention there is provided a method of producing a container of corrosion inhibitor comprising:

(a) providing a container member having a tubular wall, (b) compacting a dosage of particulate corrosion inhibitor material within the container member, suitably against a support surface, to form a compacted block of the particulate material, (c) introducing a partition member into the container member, such that it extends between opposed sides of the tubular wall in facing relationship with the dosage, and (d) developing a magnetic force forming pressure to engage the tubular wall and partition member to produce a joint therebetween.

The joint is, in particular, a sealed joint whereby the tubular wall and the partition member are electrically contacted or connected.

It will be understood that the particulate material, when introduced into the container member, will extend between the opposed sides of the tubular wall and on being compacted will form a block conforming to the interior surface of the tubular wall. Thus in the case of a cylindrical interior surface, the compacted block will be cylindrical.

The partition member is dimensioned so that its peripheral edge conforms to the interior surface of the tubular wall but is of slightly smaller peripheral length. In this way, the partition member is readily introduced into the container member. Thus, in the case of a cylindrical interior surface, the partition member is suitably a disc having a diameter slightly less than the diameter of the interior surface.

In carrying out step (d) it is not necessary that the peripheral edge of the partition member contact the interior surface of the wall, and they may be in closely spaced-apart relationship.

By repeating steps (b) and (c) sequentially at least once prior to step (d) there can be produced a compartmentalized container containing a plurality of dosages of compacted corrosion inhibitor, adjacent dosages being separated by partition members.

It is not necessary that the compacting of (b) be carried out prior to introduction of a partition member in (c). Indeed, a plurality of dosages of the particulate material and a plurality of partition members may be provided or introduced within the tubular wall, such that adjacent dosages are separated by one of the partition members, whereafter the assembly of dosages and partition members can be compacted in a single compacting step or operation to produce compacted blocks of the material separated by partition members.

The resulting container of corrosion inhibitor can, in particular, be employed in the filter element and device of the invention.

BRIEF DESCRIPTION OF THE DRAWINGS

The invention is illustrated in particular and preferred embodiments by reference to the accompanying drawings, in which:

FIGS. 4(a) to (f) illustrate schematically assembly of container of corrosion inhibitor for the device of FIG. 1

DETAILED DESCRIPTION OF PREFERRED EMBODIMENT

Figure 1:
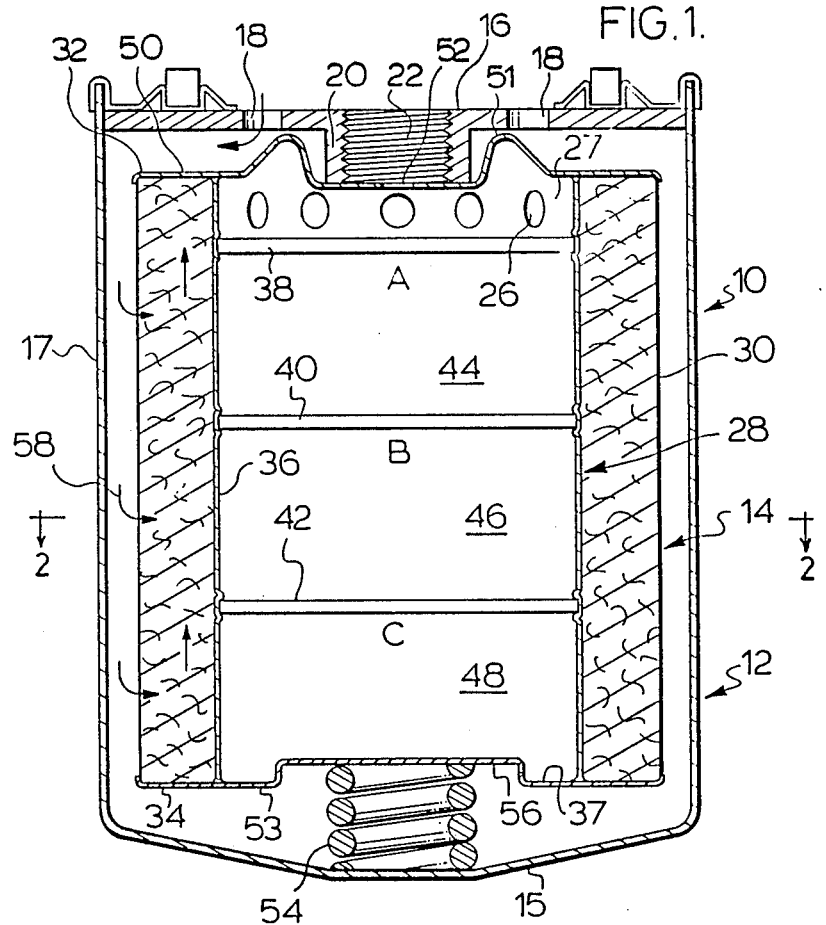
FIG. 1 is a schematic representation in cross-section of a filter device of the invention.

With further reference to FIG. 1, a filter device 10 includes a housing 12 and a filter element 14.

Housing 12 comprises a base 15, a cover plate 16 and a tubular sidewall 17 extending between base 15 and cover plate 16.

A hub 20 having a threaded inner wall 22 extends centrally downwardly in cover plate 16, and inlet orifices 18 for engine coolant extend through plate 16.

Filter element 14 comprises a cylindrical container 28 which is surrounded by and supports a tubular pleated filter medium or sleeve 30.

Container 28 includes an upper plate 50 having a rim flange 32, a lower plate 53 having a rim flange 34 and a tubular wall 36 having a floor 37.

Spaced apart partitions 38, 40 and 42 of disc shape are housed within tubular wall 36 thereby separating container 28 into chambers 44, 46 and 48, such chambers respectively containing predetermined dosages A, B and C of corrosion inhibitor for engine coolant, in particulate form.

Plate 50 includes an annular sealing element 51 which engages the underside of cover plate 16, and an outlet orifice 52 extends centrally through plate 50.

A spring 54 extends between base 15 and a spring cavity 56 in floor 37 of container 28.

A plurality of apertures 26 is formed in tubular wall 36 and communicate with an outflow chamber 27.

Figure 2:
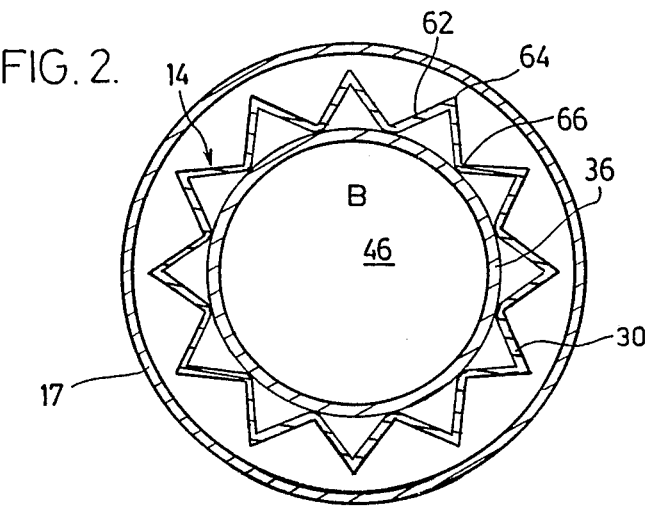
FIG. 2 is a sectional view of the filter device of FIG. 1 taken along lines 2—2 of FIG. 1.

With further reference to FIGS. 1 and 2, tubular filter medium or sleeve 30 is supported by tubular inner wall 36 and has pleats 62 comprising peaks 64 and valleys 66.

Tubular filter sleeve 30 comprises a multitude of small inter-connected tiny pores and passages and is thereby permeable to engine coolant, and permits flow of coolant therethrough, but retains solid matter carried by the coolant, in the tiny pores and passages.

Figure 5:
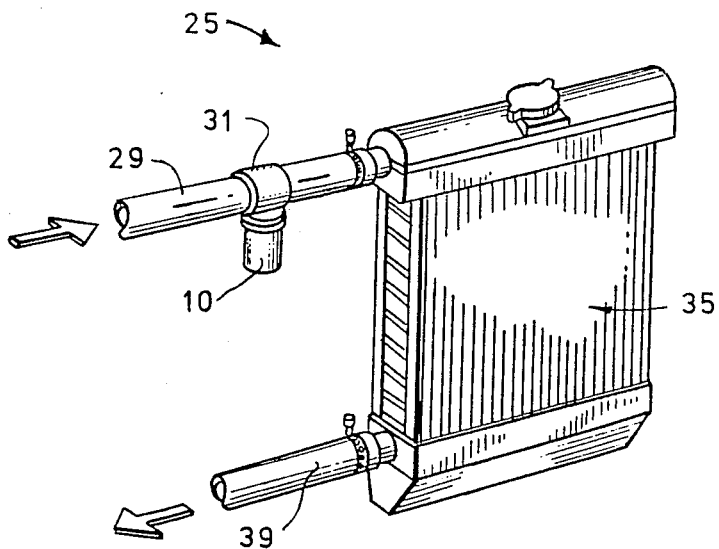
FIG. 5 is a perspective view of an engine cooling system having a filter device incorporated therein.

In use, filter 10 is connected into, by means of threaded wall 22 of hub 20, an engine cooling system 25 (See FIG. 5) provided for circulating flow of engine coolant. The filter device 10 is disposed so that at least a portion of the engine coolant flowing through an inlet hose 29, is diverted through inlet orifices 18 into housing 12, by a T-connection 31, is filtered by filter sleeve 30, and filtered coolant exits through hub 20 back into inlet hose 29 by T-connection 31. The coolant then flows through a conventional heat exchanger or radiator 35, exiting through an outlet hose 39 back to the engine. The flow path 58 of the engine coolant in device 10 is shown by the arrows (in FIG. 1). Thus, in particular, engine coolant passes through orifices 18 into housing 12, enters tubular filter member 30 along its length, flows upwardly of filter member 30 and thence through apertures 26 and outflow chamber 27 to outlet orifice 52 and hub 20.

Spring 54 urges filter element 14 upwardly so that the sealing element 51 of plate 50 engages the underside of cover plate 16 inwardly of the inlet orifices 18. Sealing elements 51 prevent direct passage of coolant from inlet orifices 18 to exit through hub 20 during normal operation.

In the device 10 shown in FIG. 1, partition 38 is exposed on its upwardly facing surface to engine coolant flowing through chamber 27 in flow path 58. With the passage of time in service the engine coolant becomes increasingly corrosive. The increase in corrosiveness of the coolant may be caused by several factors including: over dilution of the coolant, degradation of one or more of the corrosion inhibitors by heat or aeration, and introduction to the coolant of corrosive species such as chloride and sulphate ions, in make-up diluent, for example tap water. Partition 38 is structured such that it will rapidly disintegrate by corrosive attack of the engine coolant having a predetermined level of corrosiveness before other parts of the engine coolant system corrode. For purposes of this specification, the term disintegrate or disintegration is intended to include perforation or partial disintegration or dissolution of the partitions.

Disintegration of partition 38 releases the dosage A of particulate corrosion inhibitor in chamber 44 into the coolant; the solid corrosion inhibitor is entrained in the flowing coolant and conveyed through hub 20 into the circulating system so that the corrosion inhibitor content of the coolant is restored and corrosiveness of the coolant diminished.

Partition 40 is now exposed to coolant in flow path 58 and it will disintegrate in the same manner as partition 38 when the level of corrosion inhibitor in the circulating coolant decreases to an extent such that the corrosiveness of the coolant reaches the predetermined level.

Similarly after partition 40 disintegrates, partition 42 will be exposed to coolant in flow path 58 and will disintegrate in the same manner as partitions 38 and 40.

In this way the dosages A, B and C of corrosion inhibitor are successively released into the engine coolant over a period of time to maintain a content of corrosion inhibitor effective to prevent increase of the corrosiveness of the coolant to an extent which will result in damage by corrosion to parts of the circulation system contacted by the coolant.

It will be understood that partitions 38, 40 and 42 are structured so that they corrode or are sacrificed preferentially rather than other parts of the circulating system contacted by the flowing coolant, including parts of the main coolant system and parts of the device 10 itself, including housing 12 and container 28.

The partitions 38, 40 and 42 may be structured by reference to their dimensions, for example their thickness, which typically may be about 0.05 inches, as well as their compositions and physical character so as to preferentially corrode relative to the other parts of the circulation system contacted by the coolant, for example the heat exchanger 35, thereby providing controlled, delayed release of corrosion inhibitor.

The partitions 38, 40 and 42 may thus be structured in accordance with the teachings of U.S. Pat. No. 4,333,516, R. H. Krueger et al, issued June 8, 1982, U.S. Pat. No. 4,338,997, R. H. Krueger et al, issued July 13, 1982, or U.S. Pat. No. 4,347,895, J. L. Zamboro, issued Sept. 7, 1982, all assigned to Borg-Warner Corporation.

Thus, it is not necessary that the whole of the partitions 38, 40 and 42 disintegrate and the invention contemplates that the whole or a part or parts of the partitions 38, 40 and 42 disintegrate to permit entry of the dosages A, B and C, respectively, into the flowing coolant. Thus, in one embodiment only defined zones of the partitions 38, 40 and 42 may disintegrate, for example an annular zone adjacent wall 36, or a disc-shaped or rectangular zone located generally centrally of the partitions.

Thus, all that is required is that a sufficient part or zone of each of the partitions 38, 40 and 42 disintegrate to provide openings to permit the corrosion inhibitor to enter the flowing coolant.

In an especially preferred embodiment, the container 28, in particular wall 36 has a surface of copper which acts as a cathode to partitions 38, 40 and 42 to promote corrosion of such partitions.

Thus, tubular wall 36 may have a copper or copper alloy surface and may be a wall composed of the copper or copper alloy, or may be of another structural material coated with copper or the copper alloy. It will be understood that the composition of such structural material is not important provided it has the necessary characteristics for formation of the tubular wall 36, and does not interfere with the intended operation. For example, the structural material may be of metal or plastic. Noble metals or alloys other than copper may be employed in tubular wall 36. On the other hand, tubular walls 36 of copper or a copper alloy have particular advantages with respect to availability, cost and manufacturing techniques for forming them.

The partitions 38, 40 and 42, or at least the portions or zones which are to rapidly disintegrate are preferably formed from less noble metals or metal alloys at the active end of the galvanic series of metals. Especially preferred are magnesium and magnesium alloys, for example a particularly preferred alloy contains, in weight %, 23% Al, one or more of 0.1-0.2% Fe, 2% Pb, 2% Sn, 0.1% Ni, 0.1% Cu with the balance being magnesium.

The device 10 provides maximum exposure of wall 36 to coolant in flow path 58 to facilitate the cathodic action of wall 36.

In a particular operation the device 10 is employed in the circulating cooling system of a diesel truck, in which coolant circulates at 40-250, typically 80-100 g/m. The by-pass of coolant into device 10 is at about 2 g/m.

The device 10 is replaced at intervals of about 60,000 to 80,000 miles of operation of the truck.

It is also possible to replace filter element 14 as a sub-component of device 10. In manufacturing filter element 14, filter sleeve 30 is fitted, as by sliding, about wall 36 of container 28 until a lower end of sleeve 30 engages rim flange 34 whereafter plate 50 is secured, for example by epoxy adhesive to the upper end of wall 36.

Figure 3:
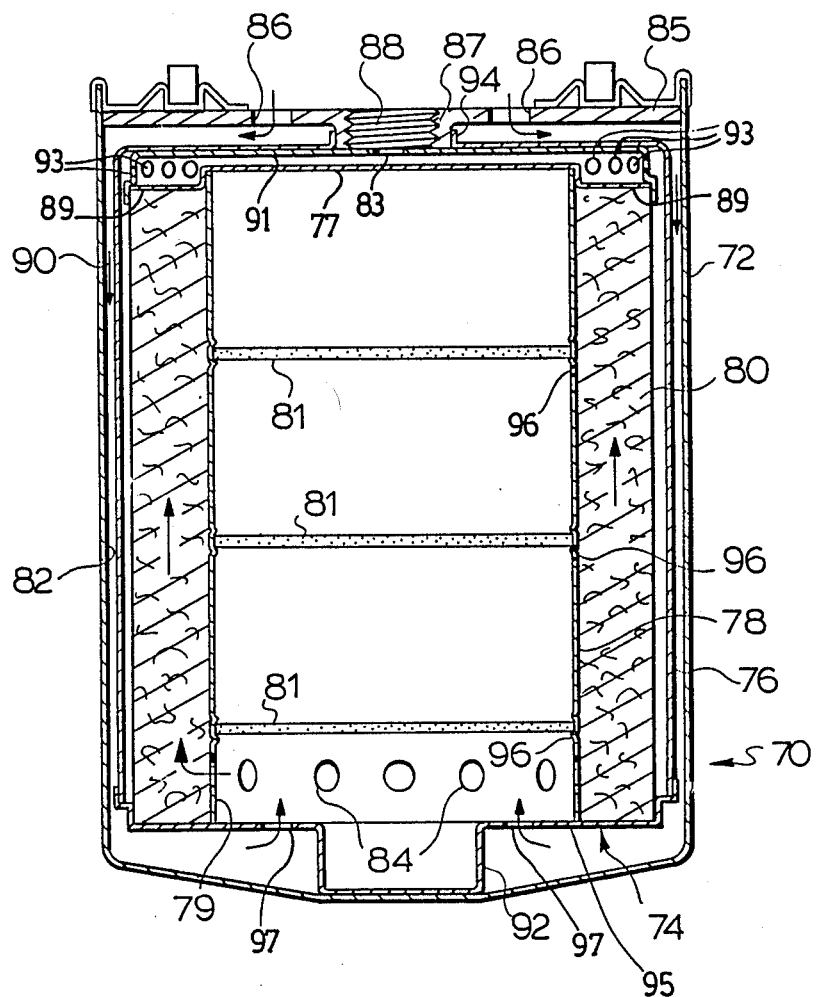
FIG. 3 is a schematic representation in cross-section of a filter device of the invention in a different embodiment.

With reference to FIG. 3, there is shown a filter device 70 which is generally similar to filter device 10 of FIG. 1, but differs in that filter element 74, although of the same general structure as filter element 14, is inverted.

More especially, filter device 70 comprises a housing 72 and a filter element 74. Filter element 74 includes an outer casing 76, a cylindrical container 78 surrounded by a filter medium or sleeve 80, and a upper cap member 91 having a plurality of peripheral flow orifices 93 for flow of coolant from filter sleeve 80 to an upper central outlet orifice 83 in cap member 91. Filter element 74 also has a lower plate 95 attached by adhesive to container 78 and outer casing 76. Plate 95 has flow orifices 97 for flow of coolant therethrough.

Housing 72 includes a cover plate 85 having inlet orifices 86 and a hub 87 defining an outlet 88.

Container 78 includes a roof 77 having a rim flange 89.

A spring element 92, formed in lower plate 95, urges filter element 74 upwardly until an annular sealing element 94, formed in inner casing 76, engages hub 87 inwardly of inlet orifices 86.

Container 78 has a cylindrical wall 79 and partitions 81 similar to those described with reference to FIG. 1.

In addition, vents 96 are disposed in cylindrical wall 79 immediately below the partitions 81.

A plurality of apertures 84 is formed in the lower end of cylindrical wall 79 and a flow path 90 for flow of coolant is defined by an annular flow passage 82, orifices 97, apertures 84, sleeve 80, orifices 93, orifice 83 and outlet 88.

Vents 96 provide for exit of air or gas which may otherwise collect as bubbles on the underside of the partitions 81 exposed to the coolant, which bubbles might otherwise interfere with the contact between the coolant and the partitions 81.

It will be recognized that the device 70 of FIG. 3 differs primarily from device 10 of FIG. 1 in that in the device of FIG. 3, the flowing coolant contacts the exposed partition 81 before passing through filter sleeve 80, whereas in device 10 of FIG. 1 the coolant is filtered by filter sleeve 30 before contacting the exposed partitions 38, 40 and 42.

The device 70 of FIG. 3 may thus function to filter also from the coolant particles resulting from the disintegration of partition 81.

Filter elements 14 and 74, filled with corrosion inhibitor can be manufactured by conventional procedures.

In particular, the dosages C, B and A and partitions 42, 40 and 38 may be inserted sequentially into a tube which defines wall 36. The resulting assembly is squeezed perpendicularly of the axis to mechanically lock and seal the partitions in place. Plate 53 may then be secured by adhesive to the lower end of tubular wall 36, a filter sleeve 30 is slid about wall 36 from the upper end thereof, and plate 50 is secured to the upper end by adhesive. The adhesive is one resistant to the coolant.

Instead of axial squeezing, Magneform (trade mark), a commercially available technique of Maxwell Laboratories may be employed. In this technique the assembled tube housing the dosages A, B and C and partitions 38, 40 and 42 is disposed within a ring of electromagnets which provide compressive energy.

In an especially preferred embodiment, tubular wall 36 is cathodic to the partitions 38, 40 and 42, and in the mechanical locking and sealing step, electrical contact is suitably established between wall 36 and partitions 38, 40 and 42.

With particular reference to FIGS. 4(a) to 4(f) there is illustrated the steps of producing container 28 of the device 10 of FIG. 1 in a particular embodiment.

With particular reference to FIG. 4(a) a predetermined dosage C, of particulate corrosion inhibitor is compacted in open container 102 by a ramming piston 100 to form a cylindrical block or pellet of corrosion inhibitor C. As shown in FIG. 4(b) a partition wall 42 is dropped within wall 36 and rests on block C.

With reference to FIG. 4(c) a predetermined dosage B, of particulate corrosion inhibitor is compacted in container 102 on partition 42 by ramming piston 100 to form a cylindrical block B, and, as shown in FIG. 4(d) a partition 40 is dropped within wall 36 to rest on block B.

The procedure is repeated to produce the container 28 with dosages A, B and C as shown in FIG. 4(e).

Alternatively, all three dosages A, B and C together with partitions 38, 40 and 42 can be assembled and compacted simultaneously.

With particular reference to FIG. 4(e) the container 28 is disposed between a work coil 104 connected to a high voltage energy storage capacitor 106 having a switch 108. Capacitor 106 is discharged through coil 104 inducing an intense magnetic field which, in turn, induces current in the workpiece, i.e. wall 36 setting up an opposing magnetic field. This magnetic force produces a forming pressure up to about 50,000 psi which moves wall 36 at a velocity up to 300 meters/sec.; the forming pressure engages wall 36 with partitions 38, 40 and 42 to produce joints 110 between such partitions and wall 36. This method employs the Magneform (trade mark) technique.

What we claim as our invention is:

1. A filter device for an engine coolant comprising,
    a housing having inlet means for inflow of a liquid coolant into said housing and outlet means for outflow of coolant from said housing,
    a flow path in said housing for flow of coolant from said inlet means to said outlet means,
    a filter means in said flow path effective to filter the coolant,
    a container of corrosion inhibitor for said coolant in said housing, said container being effective to maintain said corrosion inhibitor isolated from and in non-contacting relationship with coolant in said flow path and having a portion with a surface exposed to said flow path, at least part of said portion being adapted to disintegrate by corroding when coolant in said flow path has a corrosiveness above a predetermined level, to release corrosion inhibitor from said container into said flow path.

2. A filter device according to claim 1, wherein said portion comprises a partition and said container has a plurality of compartments separated by partitions, each compartment containing a dosage of said corrosion inhibitor.

3. A filter device according to claim 2, wherein said filter means comprises a tubular filter member surrounding said container.

4. A filter device according to claim 3, wherein said container has a tubular wall, said partitions extending inwardly of said wall in opposed spaced apart relationship to define said compartments, said partitions being disintegratible by corroding when contacted by coolant in said flow path having said corrosiveness above said predetermined level to release corrosion inhibitor from said compartments, said partitions being preferentially corrodible relative to said wall.

5. A filter device according to claim 4, wherein said container is snugly received in said tubular filter member.

6. A filter device according to claim 4, wherein said tubular wall has a plurality of spaced apart apertures defined therethrough, said apertures being disposed in said flow path.

7. A filter device according to claim 6, wherein said apertures are disposed in said flow path downstream of said filter member in said flow path.

8. A filter device according to claim 6, wherein said apertures are disposed in said flow path upstream of said filter member in said flow path.

9. A filter element for an engine coolant comprising,
    a container of corrosion inhibitor for engine coolant,
    a filter means for said coolant,
    a flow path for said coolant extending through said filter means, a portion of said container being exposed to said flow path, said portion having an outer surface exposed to said flow path and an inner surface exposed to said corrosion inhibitor, at least part of said portion being adapted to disintegrate by corroding when coolant in said flow path has a content of corrosion inhibitor below a predetermined level, to release corrosion inhibitor from said container into said flow path.

10. A filter element according to claim 9, wherein said portion comprises a partition and said container has a plurality of compartments separated by partitions, each compartment containing a dosage of said corrosion inhibitor.

11. A filter element according to claim 10, wherein said filter means comprises a tubular filter sleeve surrounding said container.

12. A filter element according to claim 11, wherein said container has a tubular wall and said partitions extend inwardly of said wall in opposed spaced apart relationship to define said compartments, said partitions being rapidly disintegratible by corroding when contacted by coolant in said flow path having said corrosiveness above said predetermined level, to release corrosion inhibitor from said compartments, said partitions being preferentially corrodible relative to said wall.

13. A filter element according to claim 9, wherein said flow path comprises a plurality of spaced apart apertures defined in said container.

14. A cooling system for engine coolant having a filter device incorporated therein the filter device comprising,
a housing having inlet means for inflow of a liquid coolant into said housing and outlet means for outflow of coolant from said housing,
a flow path in said housing for flow of coolant from said inlet means to said outlet means,
a filter means in said flow path effective to filter the coolant,
a container of corrosion inhibitor for said coolant in said housing, said container being effective to maintain said corrosion inhibitor isolated from and in non-contacting relationship with coolant in said flow path and having a portion with a surface exposed to said flow path, at least part of said portion being adapted to disintegrate by corroding when coolant in said flow path has a corrosiveness above a predetermined level, to release corrosion inhibitor from said container into said flow path.

15. A cooling system according to claim 14, wherein said system comprises a heat exchanger, an inflow line for flow of heated coolant into said heat exchanger and an outflow line for flow of cooled coolant from said heat exchanger, said filter device being incorporated in one of said lines so that at least a portion of flowing coolant is bled off into said inlet means, passed along said flow path and returned to said one line through said outlet means.

16. A method of treating a flowing engine coolant comprising,
providing a housing having an inlet for inflow of a liquid coolant and an outlet for outflow of the coolant, flowing said coolant along a flow path from said inlet to said outlet,
filtering said coolant in said flow path, and
contacting the flowing coolant in said flow path with separating means, said separating means separating said flowing coolant from a dosage of corrosion inhibitor for the coolant, at least a part of said separating means being adapted to disintegrate by corroding when coolant in said flow path has a corrosiveness above a predetermined level,
flowing said coolant in contact with said separating means,
allowing said coolant to increase in corrosiveness to said predetermined level, and
allowing said separating means to disintegrate to release said dosage of corrosion inhibitor into said coolant.

17. A method according to claim 16, wherein said filtering is upstream of said contacting.

18. A method according to claim 16, wherein said filtering is downstream of said contacting.

* * * * *